US005386395A

United States Patent [19]

Le Guerinel et al.

[11] Patent Number: 5,386,395

[45] Date of Patent: Jan. 31, 1995

[54] ULTRASONIC DEVICE COMPRISING AN ACTIVE IMPEDANCE MATCHING DEVICE BETWEEN AN ULTRASONIC TRANSDUCER AND THE GENERATOR FOR GENERATING PULSE SIGNALS FOR THE TRANSDUCER

[75] Inventors: Yves Le Guerinel, Mellin; Raoul Mallart, Paris, both of France

[73] Assignee: U.S. Philips Corporation, New York, N.Y.

[21] Appl. No.: 143,796

[22] Filed: Oct. 27, 1993

[30] Foreign Application Priority Data

Oct. 28, 1992 [FR] France ............................ 92 12879

[51] Int. Cl.$^6$ ............................ H04B 1/00

[52] U.S. Cl. ............................ 367/137

[58] Field of Search ............... 367/135, 137, 123, 152; 128/662.03, 662.06

[56] References Cited

U.S. PATENT DOCUMENTS 4,752,918 6/1988 Boucher et al. .................... 367/123

5,243,988 9/1993 Siben et al. .................... 128/662.06

FOREIGN PATENT DOCUMENTS 2501447 9/1982 France .

*Primary Examiner*—Daniel T. Pihulic

*Attorney, Agent, or Firm*—Jack D. Slobod

[57] ABSTRACT

An ultrasonic active impedance matching device between an ultrasonic transducer and a generator of pulses includes an interface stage (100) and a matching stage (200) which are connected by way of a coaxial cable (150) having an impedance of 50 ohms. The interface stage (100) has a sub-assembly (10, 11, 12, 13, 14) for generating a d.c. signal having an amplitude which is proportional to but smaller than the peak value of the pulses, a sub-assembly (15, 16, 17 50) for generating a low-voltage pulse which is matched with the impedance of the cable, and a programmable power supply (18) for producing a d.c. voltage which is applied to the transducer via the cable. The matching stage (200) has a sub-assembly (19) for transmitting the excitation pulse of the transducer (2) and a receiving sub-assembly (20, 21) for returning the echographic signal to the generator (1) via the cable (150).

12 Claims, 2 Drawing Sheets

ULTRASONIC DEVICE COMPRISING AN ACTIVE IMPEDANCE MATCHING DEVICE BETWEEN AN ULTRASONIC TRANSDUCER AND THE GENERATOR FOR GENERATING PULSE SIGNALS FOR THE TRANSDUCER

BACKGROUND OF THE INVENTION

1. Field of the Invention

The invention relates to an ultrasonic device including an ultrasonic transducer and a generator for generating pulses for the transducer, the generator being connected to the transducer via an active impedance matching device. The invention can be used notably in the field of non-destructive testing by means of ultrasound.

2. Description of the Related Art

A current trend in notably the cited technical field is the use of ultrasonic transducers having a very large bandwidth and a short pulse duration and offering an excellent spatial resolution. Their use, however, is impeded by the difficulty in matching their electric impedance to that of the connection cable, generally speaking a coaxial cable having an impedance of 50 ohms, throughout their passband (this restriction is particularly annoying for the testing of large objects for which long cable lengths are required). Actually, at the end of its connection cable for connection to the generator for generating the excitation pulse signals, the transducer which receives the electric signals transmitted by said generator and corresponding to the ultrasonic signals to be transmitted in the ultrasound propagation medium is only rarely matched, because the impedance of a transducer is a complex variable which is difficult to define, notably its 50-ohm matching being limited to a single frequency, i.e. the central frequency for which the transducer has been manufactured. Moreover, even when realised approximately, matching is accompanied by a disturbing inductive effect in the form of a counter-electromotive force. Finally, even in the receiving mode the excitation pulse signal generator does not "see" a 50 ohm impedance, except again for a single frequency.

French Patent Application No. 2501447 describes an assembly for exciting an electroacoustic transducer by means of an electronic generator which utilizes locking means for maintaining a maximum transfer of energy between said generator and the transducer, which means measure the dephasing between the intensity of the current and the voltage supplied by the generator and correct the reactive component of the impedance of the transducer in a sense appropriate to eliminate said dephasing. Such impedance matching enables the operating frequency band of the transducer to be enlarged to a given extent, but it remains comparatively inaccurate since the means used are based on inductive elements and are hence sensitive to the experiment conditions, notably to the length of the connection cables between the generator and the transducer.

SUMMARY OF THE INVENTION

It is an object of the invention to propose an ultrasonic device which mitigates the described drawbacks by enabling 50-ohm matching in all situations, without resorting to the comparatively coarse conventional solutions based on variable inductance.

To this end, the invention provides a device of the kind set forth which is also characterized in that:

(A) the matching device comprises on the one hand an interface stage and on the other hand a matching stage, which stages are connected by way of a coaxial cable having an impedance of 50 ohms;

(B) in that said interface stage itself comprises:

(a) a sub-assembly for generating a d.c. signal whose amplitude is proportional to but smaller than the peak value of said pulses;

(b) a sub-assembly for generating, on the basis of said d.c. signal and the output pulse of said generator, an electrical low-voltage pulse which is matched with the impedance of said coaxial cable connecting the transducer to the generator;

(c) a programmable power supply for generating, on the basis of said d.c. signal, a d.c. voltage which is applied to the transducer via said cable;

(C) in that said matching stage itself comprises:

(d) a transmission sub-assembly which receives, via said cable, the output signals of the programmable power supply and of the sub-assembly for generating low-voltage pulses, and whose output signal constitutes the excitation pulse applied to the transducer;

(e) a receiving sub-assembly which receives from the transducer its response signal to the excitation pulse and which returns this echographic signal to said generator via said cable.

The proposed structure eliminates said limitations by utilizing an active impedance matching device which can be integrated in a casing of small dimensions comprising an emitter and a limiter-receiver. The interface between this casing, attached directly to the ultrasound transducer, and the generator is realised by way of a compact electronic system. Using the device thus constructed, full benefit can be derived from broadband transducers throughout the non-destructive ultrasonic testing installation.

BRIEF DESCRIPTION OF THE DRAWINGS

The particularities and advantages of the invention will become apparent in detail from the following description and the attached drawings, given by way of non-limitative examples, where.

DESCRIPTION OF PREFERRED EMBODIMENT

Figure 1:
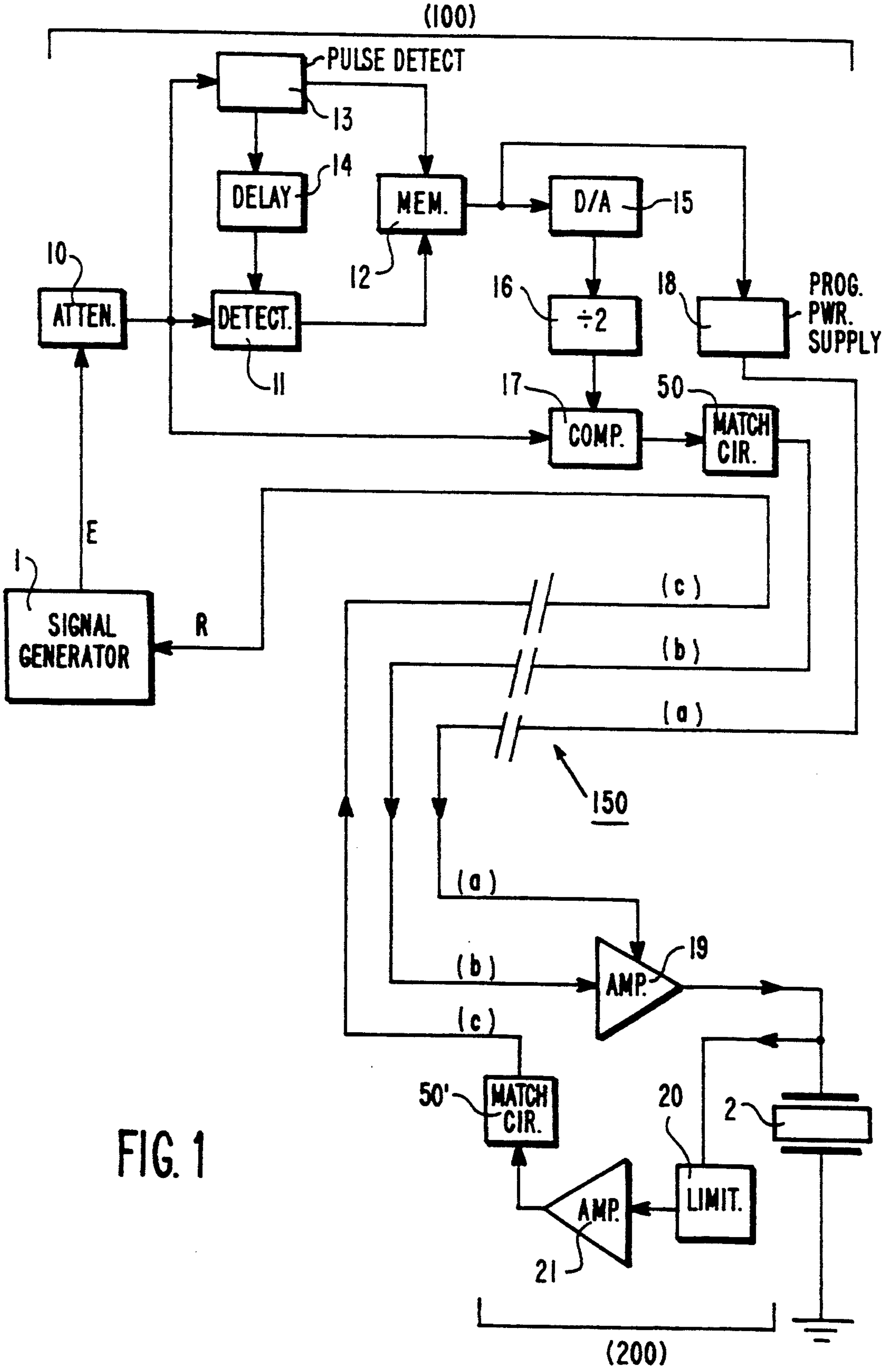
FIGS. 1 and 2 are two schematic diagrams of different embodiments of the invention.

FIG. 1 shows the first embodiment of the invention in which the active impedance matching device comprises, connected between a signal generator 1 and an ultrasonic transducer 2, on the one side an interface stage 100 and on the other side a matching stage 200.

The interface stage 100 itself comprises the following elements. An attenuator 10 receives the electric pulse transmitted by the transmission terminal E of the generator 1 and having an amplitude V, and outputs a pulse which is similar but has a reduced amplitude aV, the coefficient a being smaller than 1. A detector 11 detects the peak value of said attenuated pulse and stores it in digital form in a memory 12, the storage command being applied to the memory by a pulse detector 13. The pulse detector also receives said attenuated pulse in order to control, by way of a delay circuit 14, the resetting to zero of the peak detector 11 as soon as the detected peak value has been effectively stored. The stored value is applied on the one side to a digital-to-analog converter 15, followed by a two-divider 16 and subsequently by a comparator 17, and on the other side to a programmable power supply 18 which serves to supply, on the basis of the peak value aV, a d.c. voltage of amplitude V. The digital-to-analog converter 15 supplies a d.c. voltage aV, divided by two by the divider 16, and the comparator 17, receiving on the one hand this d.c. voltage aV/2 and on the other hand the output pulse of amplitude aV from the attenuator 10, supplies a low voltage square-wave pulse (for example, 5 volts) of the same width as the pulse initially transmitted by the generator 1 (actually, the output signal of the comparator is zero as soon as the output of the attenuator 10 becomes zero again). A 50-ohm matching circuit 50 is connected to the output of the comparator 17.

The object of the interface stage 100 can thus be described as follows. It concerns the detection of the duration and the amplitude of the transmission pulse alter which, on the basis thereof, a pulse of the same duration but of low voltage is form and, after 50-ohm matching, it is applied (connection (b)), as well as the high voltage supplied by the programmable power supply (connection (a)), to the transducer via a coaxial cable 150 (having an impedance of 50 ohms) and the matching stage 200 connected to the end of this cable.

The matching stage 200, provided at the end of the cable 150, itself comprises first of all a transmission sub-assembly which itself comprises an amplifier 19 having an input impedance matched to 50 ohms. This amplifier receives on the one hand, via the 50-ohm matching circuit 50, the low-voltage pulse (in this case 5 volts) present at the output of the comparator 17, and on the other hand the d.c. output voltage V from the programmable power supply 18, and outputs an output pulse of amplitude V which is the excitation signal applied to the transducer 2. The matching stage 200 also comprises a receiving sub-assembly which itself comprises a series connection of a limiter 20 for protection against the high voltage excitation pulse, followed by an amplifier 21 and, again, a 50-ohm matching circuit 50'. The coaxial cable 150 thus ensures (connection (c)) the return of the output signal of this 50-Ohm matching circuit to the receiving terminal R of the generator 1.

Figure 2:
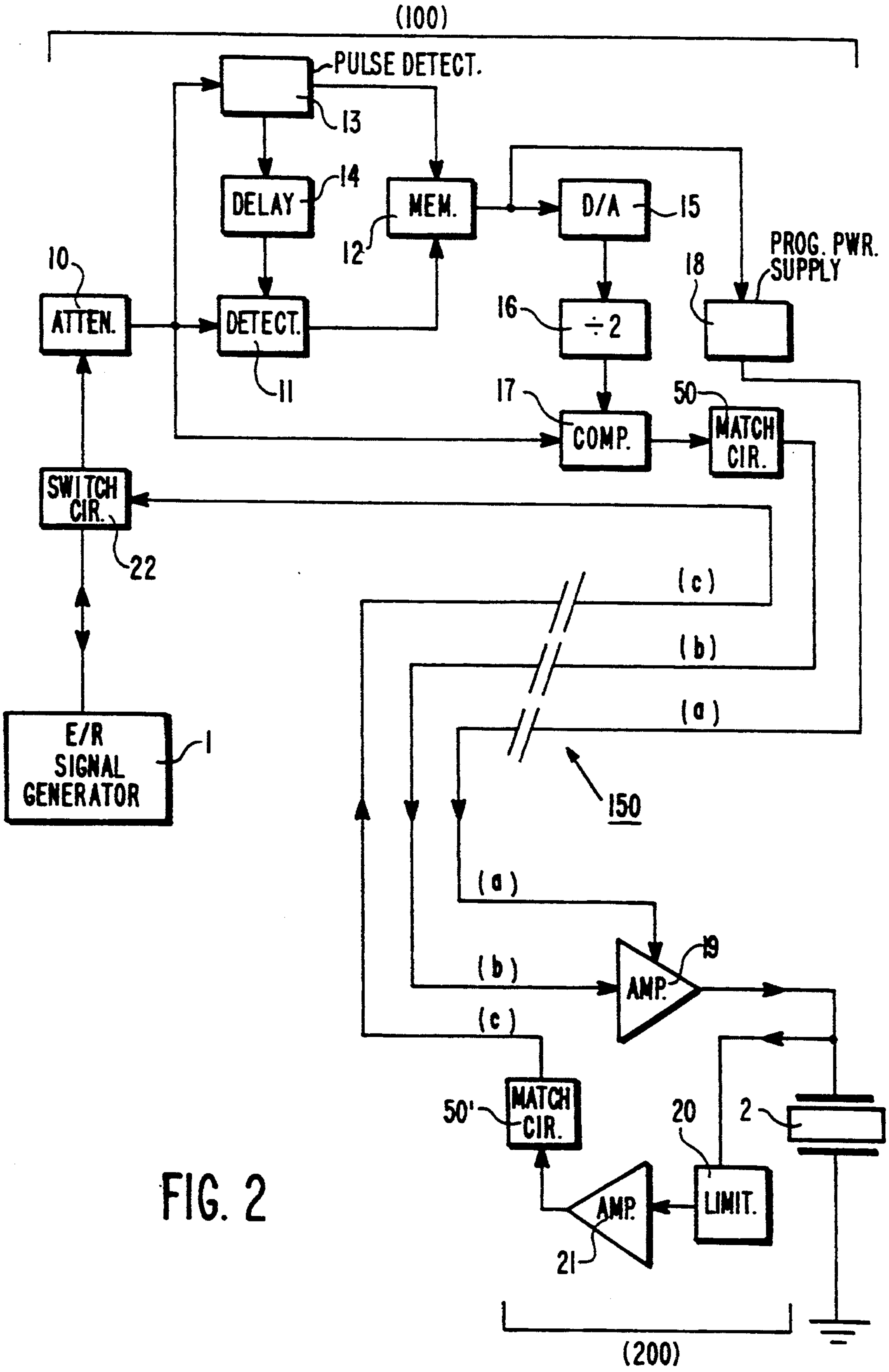

A second embodiment of the invention relates to the case where the generator used comprises only a single input/output terminal E/R for transmission and reception. In this case, illustrated in FIG. 2 in which all other elements bear the same reference numerals as used in FIG. 1, a switching circuit 22 is inserted on the one hand between this single terminal and the attenuator 10 in order to apply thereto the electric pulse transmitted by the generator 1, and on the other hand between this terminal and the output of the coaxial cable 150 from the receiving sub-assembly (connection (c)) in order to receive the echographic signal from the transducer 2.

Finally, all elements of the interface stage 100 can be incorporated in the generator 1. In that case it is advantageous to realise the matching stage 200 in the form of an independent module which can be independently used. This is equivalent to the generator 1 having connections (a), (b), (c), enabling the branching of this modular matching stage 200.

We claim:

1. An ultrasonic device, comprising an ultrasonic transducer and a generator for generating electric pulses for the transducer, said generator being connected to the transducer via an active impedance matching device which comprises an interface stage and a matching stage, which stages are connected by way of a cable having a predetermined standard impedance;

said interface stage comprising:

a sub-assembly for generating a d.c. signal whose amplitude is proportional to but smaller than a peak value of said pulses;

a sub-assembly for generating, on the basis of said d.c. signal and the output pulses of said generator, an output signal in the form of voltage pulses feeding said cable connecting the transducer to the generator, which output signal is matched with the impedance of said cable; and a programmable power supply for generating, on the basis of said d.c. signal, an output signal in the form of a d.c. voltage feeding said cable; and said matching stage comprising:

a transmission sub-assembly which receives, via said cable, the output signals of the programmable power supply and of the sub-assembly for generating voltage pulses, and whose output signal constitutes an excitation pulse applied to the transducer; and a receiving sub-assembly which receives from the transducer an echographic response signal to the excitation pulse and which returns this echographic signal to said generator via said cable.

2. A device as claimed in claim 1, wherein said sub-assembly for generating a signal of proportional amplitude comprises an attenuator which receives the pulses transmitted by the generator and produces attenuated pulses, a detector for detecting the peak value of each of said attenuated pulses, a memory for storing said peak value, and a pulse detector for resetting said peak detector to zero by way of a delay circuit, wherein the sub-assembly for generating the voltage pulses feeding said cable comprises a converter for converting the peak value stored into a d.c. voltage, a divider-by-2 for said d.c. voltage, and a comparator for comparing the output of said attenuator and said divided voltage, followed by a matching circuit for said predetermined impedance, wherein said transmission sub-assembly is an amplifier, and wherein said receiving sub-assembly comprises a series connection of a limiter for protection against the excitation pulse transmitted by the amplifier to the transducer, an amplifier for the output signal of said limiter, and a matching circuit for said predetermined impedance.

3. A device as claimed in claim 2, wherein the generator comprises only a single input/output terminal for transmission and reception, and also comprises a switching circuit which is inserted between said terminal and the attenuator so as to apply thereto the generated electric pulses, as well as between said terminal and the output of the coaxial cable from the receiving sub-assembly in order to receive the echographic signal.

4. A device as claimed in claim 1, wherein the matching stage is constructed as an independent module so that it can be independently used when the elements of the interface stage are incorporated in the generator.

5. A device as claimed in claim 2, wherein the matching stage is constructed as an independent module so that it can be independently used when the elements of the interface stage are incorporated in the generator.

6. A device as claimed in claim 3, wherein the matching stage is constructed as an independent module so that it can be independently used when the elements of the interface stage are incorporated in the generator.

7. An ultransonic device as claimed in claim 1, wherein said cable is a coaxial cable and said predetermined impedance is 50 ohms.

8. An ultransonic device as claimed in claim 2, wherein said cable is a coaxial cable and said predetermined impedance is 50 ohms.

9. An ultransonic device as claimed in claim 3, wherein said cable is a coaxial cable and said predetermined impedance is 50 ohms.

10. An ultransonic device as claimed in claim 4, wherein said cable is a coaxial cable and said predetermined impedance is 50 ohms.

11. An ultransonic device as claimed in claim 5, wherein said cable is a coaxial cable and said predetermined impedance is 50 ohms.

12. An ultransonic device as claimed in claim 6, wherein said cable is a coaxial cable and said predetermined impedance is 50 ohms.

* * * * *